Sept. 15, 1970      K. E. HAMMER      3,528,316

SHAFT BALANCER

Filed Dec. 9, 1968

KENNETH E. HAMMER

INVENTOR.

BY

Townsend and Townsend

UNITED STATES PATENT OFFICE

3,528,316
SHAFT BALANCER
Kenneth E. Hammer, 1776 Lunsford,
McKinleyville, Calif. 95521
Filed Dec. 9, 1968, Ser. No. 782,387
Int. Cl. F16f 15/32
U.S. Cl. 74—573    5 Claims

ABSTRACT OF THE DISCLOSURE

A balancer for installation on a shaft or like rotatable member, which balancer has two relatively rotatable bodies. Each body is composed of two segments of dissimilar material, one material being relatively dense, the other material being relatively lightweight. The two segments are of truncated cylindric form and are complementary to one another so that the mass of each sector around the periphery of the body varies linearly with the position of the sector.

---

This invention relates to a shaft balancer for installation on a rotatively driven shaft in such a way as to be adjustable to compensate for dynamic unbalances in the shaft in order to reduce or eliminate vibration.

Irrespective of the care taken in constructing rotative machinery, unbalanced conditions that cause vibrations are vitually inevitable. Employment of prior art devices of the type described in U.S. Pat. No. 1,645,343 ameliorates such vibration conditions by providing two eccentric members that can be rotated relative one another and relative the shaft. The present invention provides a device bearing certain similarities to the prior art structures; a device according to the present invention, however, possesses advantages not provided by such prior art devices.

An object of the present invention is to provide a dynamic shaft balancer that has a perfectly cylindrical outer periphery, thereby to eliminate aerodynamically induced vibration. This object is achieved by providing a shaft balancer that is constituted by two or more cylindric bodies, each one of which has an eccentric mass distribution, that are rotatable on the shaft relative to one another.

Another object of the invention is to provide a shaft balancing device that achieves more precise dynamic balance. This object is achieved by forming each of the eccentric members such that the degree of mass eccentricity varies linearly around the periphery of eccentric bodies. Thus, there is a linear relationship between the relative rotative position of two of the bodies on a shaft and the mass distribution within the bodies.

Still another object of the present invention is to provide a shaft balancer that can be incorporated into shaft couplings or like shaft-mounted fixtures. Attainment of this object is possible because the configuration of the axial ends of each of the eccentric bodies is not critical. Accordingly, the eccentric bodies can be butted against such shaft-mounted fixtures.

Other objects, features and advantages will be more apparent after referring to the following specification and accompanying drawing in which.

Figure 1:
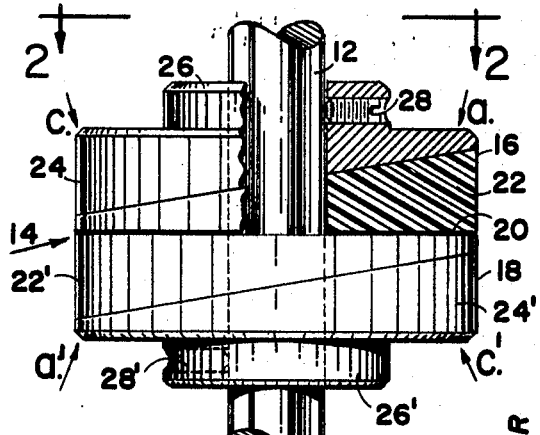
FIG. 1 is a view of a shaft balancer according to the present invention installed on a shaft.

Referring more particularly to the drawing, reference numeral 12 indicates a shaft on which is mounted a balancer 14. Balancer 14 is composed of two substantially identical bodies 16 and 18, which abut one another without interconnection on a plane 20 that is transverse of the axis of shaft 12. Body 16 is formed by a truncated cylindric segment 22 and a complemental truncated cylindric segment 24. For convenience in fabrication, segments 22 and 24 are homogeneous throughout their entire extent. Segment 22 is formed of relatively lightweight material, such as phenolic laminant or like material having a relatively low specific gravity, about 2.7. Truncated cylindric segment 24 is formed of a more dense material, such as steel or cast iron. The angle of the plane of truncation of portion 22 is complementary to the corresponding plane in segment 24, as a consequence of which the two segments fit together to provide body 16 with a smooth cylindric exterior surface. Integral with segment 24 is a concentric mounting hub 26 which includes a radially extending set screw 28 or like expedient for adjustably securing the hub to shaft 12.

Body 18 is substantially identical to body 16; the components thereof are therefore indicated in the drawing by the same reference numerals primed. It will be clear from FIG. 1 that tightening of set screws 28 and 28' with the parts in the assembled condition as shown in the figure will retain the parts in operative assembly without requiring any direct connections between segment 22 and segment 24 or between segments 22 and 22'. This not only simplifies construction and assembly, but avoids discontinuities in the mass of the various parts.

In order to utilize the balancer of the present invention, the approximate degree and location of unbalance of shaft 12 is determined and the bodies 16 and 18 are preliminarily positioned on the shaft. Set screws 28 and 28' are tightened, care being taken that bodies 16 and 18 abut one another along plane 20. The shaft is then rotatively driven and bodies 16 and 18 are adjusted into a final and precise balance by employment of conventional techniques. It will be appreciated that because the change in mass distribution around the periphery of the bodies 16 and 18 is linear, the balancing procedure is expedited. Moreover, the effect on the balance of rotative movement of one or both of the bodies is predictable because of the linear relationship between mass and circumferential position.

Figure 2:
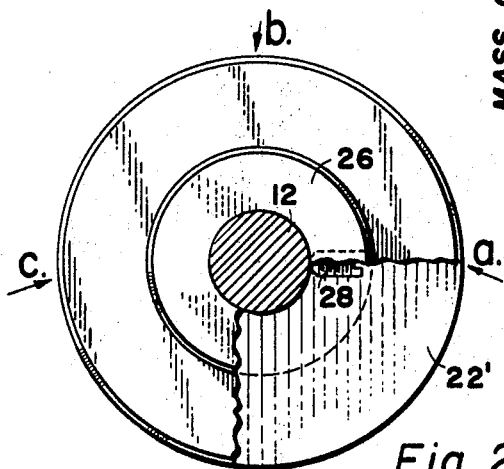
FIG. 2 is an end view of the balancer of FIG. 1 with portions thereof broken away to reveal internal details.
Figure 3:
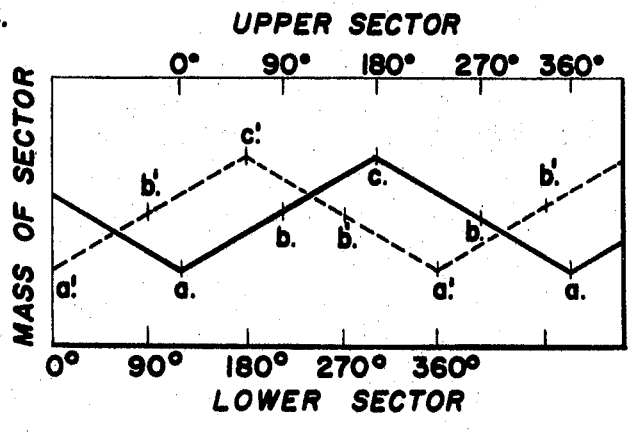
FIG. 3 is a graph of weight versus circumferential position of a sector of the eccentric bodies of the present invention.

The linear relationship can be seen in graphic form in FIG. 3 wherein distance along the lower abscissa corresponds to angular positions around the circumference of body 18, wherein distances along the upper abscissa correspond to angular positions around the circumference of body 16, and wherein distances along the ordinate correspond to the mass of a sector of body 16 or 18. The 0° point on the upper abscissa of FIG. 3 corresponds to the right-hand extremity, as viewed in FIG. 1, of body 16. A very narrow sector of body 16 at such 0° point has a minimum mass because at such point the relatively lightweight segment 22 is of maximum axial extent, and the relatively heavy segment 24 is of minimum axial extent. In FIGS. 2 and 3, such point is designated at $a$. A narrow sector at a point 90° from point $a$, designated by $b$ in FIGS. 2 and 3, has a larger mass because at such point the axial extent of relatively lightweight segment 22 has decreased and the axial extent of relatively heavy segment 24 has increased from the magnitudes thereof at point $a$. A sector positioned 180° from point $a$, indicated at $c$ in FIGS. 2 and 3, has a maximum mass because at such point the axial extent of relatively lightweight segment 22 is a minimum and the axial extent of relatively heavy segment 24 is maximum. As can be seen from FIG. 3, the rate of change of the mass of the sectors is constant. In progressing around body 16 from 180° to 360°, the mass decreases linearly. The mass vs. position relation of body 16 is designated by a broken line in FIG. 3; rotation of body 16 relative body 18 would be manifested in FIG. 3 by relative movement of the two curves in the direction of the abscissa (horizontally) and the mass at any point would be the sum of the ordinates of the curves at that point.

Figure 4:
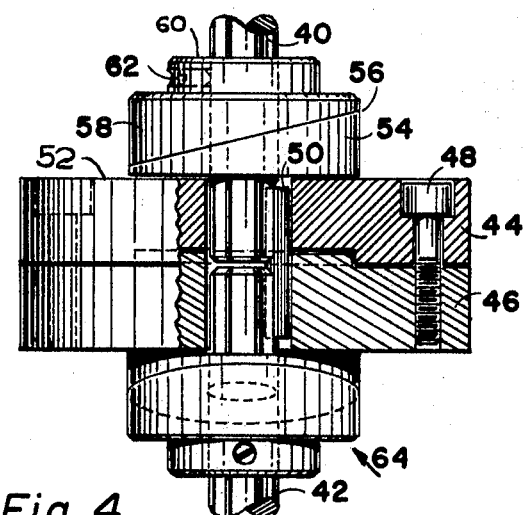
FIG. 4 is a view of a balancer according to the present invention installed in conjunction with a shaft coupling of conventional form.

The present invention can be adapted to fixed couplings and like shaft-mounted fittings as can be seen in more detail in FIG. 4. A shaft 40 is coupled to a shaft 42 by means of a split coupling that employs a collar 44 that is affixed to a collar 46 by means of a plurality of bolts 48 that pass through clearance holes in collar 44 into engagement in threaded holes in collar 46. A key 50 is fitted into keyways at the ends of shafts 40 and 42 and in the interior of collars 44 and 46 for transmitting power between the coupled shafts. At the outer axial extremities of collars 44 and 46 are plane surfaces 52 that are perpendicular to the axis of the shaft. In abutting relation to surface 52 is a relatively lightweight segment 54; segment 54 corresponds to segment 22 referred to above in connection with FIG. 1. The face of segment 54 that abuts surface 52 is complementary to the surface 52 so that a discontinuity-free, unitary assembly is afforded by the combined segments. Segment 54 is of truncated cylindric form and has a planar face 56 that is obliquely oriented with respect to the axis of shaft 40. A relatively heavy segment 58 has an oblique surface that is coterminous with face 56. Remote from such face, segment 58 includes a shoulder 60 that includes a radially extending set screw 62 or like expedient for securing the shoulder to shaft 40. Because the plane of surface 52 is perpendicular to the axis of the shafts, the composite body constituted by segments 54 and 58 can be rotated relative to collar 44 so as to vary the mass distribution afforded by such body to any desired position. In FIG. 4 reference numeral 64 indicates generally a composite body positioned at the opposite end of the shaft coupling; the composite body is identical to that constituted by segments 54 and 58 and for that reason requires no further explanation.

Adjustment into a balanced position of the structure of FIG. 4 is carried out in a manner identical to that described above in connection with FIGS. 1 and 2. When the appropriate position for balance is obtained, set screw 62 is tightened and the balancer is secured in place.

The above specific description of the invention has been in reference to balancing a shaft. It is to be understood that the diameter and/or location of the shaft is not restricted to any particular environment. For example, the balancer of the present invention can be installed on a shaft driving a water pump from a motor. It can also be installed on the crankshaft of an internal combustion engine, for which application it may well be desired to increase the overall diameter and decrease the axial extent as compared to the balancers exemplified by the drawing. Moreover, the specific materials for the relatively lightweight segment and the relatively heavy segment should not be considered limited to those specified hereinabove. In applications where the degree of unbalance is small, optimum operation is achieved by forming the two segments of materials having a relatively small difference in specific gravities. Contrariwise, if the degree of unbalance is great, the difference in specific gravity between the two segments is correspondingly increased. Moreover, the angle of truncation of the members can be established at such angle as affords optimum rate of change of mass distribution around the periphery of the balancer.

The amount of compensation for unbalance afforded by the present invention can be established at virtually any desired amount by, in addition to the selection of materials of different densities as mentioned above, increasing or decreasing the diameter and/or thickness of the truncated segments. For example, a balancer of relatively large diameter will have a greater influence than a balancer of relatively small diameter using the same amount of material. The shape of the balancer is also influenced by the application. For example, in balancing the armature of an electric motor, balancers according to the present invention of relatively large diameter and short axial extent can be mounted on the armature shaft on opposite sides of the armature and within the motor housing because the small axial extent of the balancer does not significantly lengthen the armature structure. Thus it will be seen that the invention provides a shaft balancer that is versatile and that affords more precise and predictable balancing forces than are possible with known prior art devices.

Although two embodiments of the present invention have been shown and described, it will be obvious that other adaptations and modifications can be made without departing from the true spirit and scope of the invention.

What is claimed is:

1. Apparatus for balancing a rotatable member comprising a pair of substantially identical bodies, each said body having a hole centrally axially therethrough to admit the rotatable member, said bodies each having a planar face in mutual opposing relationship, each said body being formed by two segments that have different densities, said segments contacting one another on a plane that is oblique with respect to the central axis of the bodies and of the rotatable member so that the weight of the body changes uniformly from a maximum at one point on the periphery of the body to a minimum at a point diametrically opposite said one point, and means for adjustably rotatively positioning said bodies relative one another on the shaft.

2. The invention of claim 1 wherein each said body has a cylindric exterior shape that is cylindric about an axis coextensive with the axis of rotation of the rotatable member.

3. The invention of claim 1 in combination with a shaft fitting that has surfaces at the axial extremities thereof, and wherein said bodies have end faces confronting said surfaces that are shaped complementally of said surfaces so that the faces can be butted against said surfaces to form a discontinuity-free, unitary assembly.

4. The invention of claim 1 wherein said body positioning means comprises a hub integral with one of said segments and a set screw extending radially of said hub for engagement with said rotatable member.

5. The invention of claim 1 wherein said segments are homogeneous throughout their entire extent.

References Cited

UNITED STATES PATENTS 2,206,472  7/1940  Taylor _____ 74—573
3,074,293  1/1963  Langsetmo _____ 74—573

FRED C. MATTERN, JR., Primary Examiner

F. D. SHOEMAKER, Assistant Examiner

U.S. Cl. X.R.

64—1